(12) United States Patent
Witte et al.

(10) Patent No.: US 7,143,307 B1
(45) Date of Patent: Nov. 28, 2006

(54) REMOTE DISASTER RECOVERY AND DATA MIGRATION USING VIRTUAL APPLIANCE MIGRATION

(75) Inventors: Wesley R. Witte, Campbell, CA (US); Mark Muhlestein, Tuscon, AZ (US); Gaurav Banga, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 472 days.

(21) Appl. No.: 10/098,814

(22) Filed: Mar. 15, 2002

(51) Int. Cl.
G06F 11/00 (2006.01)
(52) U.S. Cl. .............................. 714/6; 714/7
(58) Field of Classification Search .................... 714/6, 714/7
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,513,314 A * | 4/1996 | Kandasamy et al. | 714/6 |
| 5,649,152 A * | 7/1997 | Ohran et al. | 711/114 |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,978,565 A * | 11/1999 | Ohran et al. | 714/13 |
| 6,065,037 A | 5/2000 | Hitz et al. | |
| 6,425,035 B1 | 7/2002 | Hoese et al. | |
| 2002/0049718 A1 * | 4/2002 | Kleiman et al. | 707/1 |
| 2003/0018927 A1 * | 1/2003 | Gadir et al. | 714/4 |
| 2003/0051021 A1 * | 3/2003 | Hirschfeld et al. | 709/223 |
| 2003/0133578 A1 | 7/2003 | Banga et al. | |
| 2003/0191810 A1 | 10/2003 | Muhlestein et al. | |

OTHER PUBLICATIONS

Network Appliance, Inc., SnapMirror and SnapRestore, Mar. 3, 2001, p. 1, http://web.archive.org/web/20010303120759/www.netapp.com/products/filer/snap.html.*
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

* cited by examiner

*Primary Examiner*—Scott Baderman
*Assistant Examiner*—Paul Contino
(74) *Attorney, Agent, or Firm*—Cesari and McKenna, LLP

(57) ABSTRACT

A technique efficiently creates and serves a backup data set on a backup filer located at a remote site from a primary filer by essentially moving an entire operating environment of a primary data set to the backup filer. The primary filer is organized into one or more virtual filers (vfilers), one of which (the primary vfiler) is configured to serve data, such as the primary data set, for a client. In the event that the primary filer or primary vfiler becomes unavailable, the technique may be implemented as a disaster recovery or data migration sequence to enable efficient instantiation of a backup vfiler to serve the backup data set for the client.

43 Claims, 5 Drawing Sheets

REMOTE DISASTER RECOVERY AND DATA MIGRATION USING VIRTUAL APPLIANCE MIGRATION

FIELD OF THE INVENTION

The present invention relates to data backup and restoration and, more specifically, to a technique for efficiently backing-up and restoring data in accordance with remote disaster recovery and data migration.

BACKGROUND OF THE INVENTION

A file server is a computer that provides file service relating to the organization of information on persistent storage devices, such memories, tapes or disks. The file server or filer may be embodied as a storage system including a storage operating system that implements a file system to logically organize the information as a hierarchical structure of directories and files on, e.g., the disks. Each "on-disk" file may be implemented as set of data structures, e.g., disk blocks, configured to store information, such as the actual data for the file. A directory, on the other hand, may be implemented as a specially formatted file in which information about other files and directories are stored.

One type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system, such as a filer, is the Write Anywhere File Layout (WAFL™) file system available from Network Appliance, Inc., Sunnyvale, Calif. The WAFL file system is implemented as a microkernel within an overall protocol stack of the filer and associated disk storage.

The disk storage is typically implemented as one or more storage "volumes" that comprise a cluster of physical storage devices (disks), defining an overall logical arrangement of disk space. Each volume is generally associated with its own file system. In the WAFL file system, a special directory, called a "qtree", may be created that has the properties of a logical sub-volume within the namespace of a physical volume. Each file system object (file or directory) is associated with one and only one qtree, and quotas, security properties and other items can be assigned on a per-qtree basis. Each volume has its own file system identifier (ID) and each qtree within a volume has its own qtree ID.

A difficult and time-consuming issue in managing a file server or filer is copying data, e.g., a data set, from an original filer ("primary filer") to another filer ("backup filer") to protect from data loss/corruption due to primary filer failure. As used herein, a data set is defined as one or more storage units, such as volumes or qtrees, that when combined represent data being served, migrated, and protected against disaster. A primary filer is a physical filer that is serving a client's data set and a backup filer is a different physical filer functioning as a target of a data set being served from the primary filer. The backup filer may also serve its own independent data set.

One way to copy a data set onto a backup filer to ensure against total primary filer failure is to physically move the storage disks from the primary filer to the backup filer. Another approach is to generate copies of the data set on backup tapes for use with the backup filer. However, these approaches can be slow and labor-intensive processes to manage. Yet another approach is to replicate a primary filer data set at the backup filer using a conventional storage replication technique, such as remote synchronous mirroring. In a remote synchronous replication environment, a mirrored data set must be transferred over a computer network and stored ("written") to the backup filer before the write operation completes on the primary filer. Although this technique assures a high level of data currency for the backup filer, it also introduces data latency issues as a result of, among other things, performance delays inherent to remote synchronous mirroring.

The copied, mirrored data set can be used in a variety of useful ways, e.g., as local read-only copies of data that can be accessed quickly, or as an online consistent backup copy of data that can be used in the event of a failure of the original data set. However, the mirrored data set must typically be restored to the primary filer before it becomes available because the operating environment, e.g., operating system, security domain, etc., of the backup filer may be different from that of the primary filer. Thus to effectively use a mirrored data set, that data set usually must be returned to the filer of origin after the primary filer has been repaired or rebuilt.

A known Remote Disaster Facility (RDF) system available from Compaq Computer (Tandem Dictionary) maintains synchronized and consistent local and remote copies of a data set based on transfer of audit information. Briefly, the RDF system comprises a transaction-processing database on a local computer that utilizes audit information to monitor changes to the local data set. The audit information is transferred to a backup computer of the RDF system and applied to the remote copy of the data set. The backup computer can then take over a function from the local computer in the face of a disaster. However, transfer of the audit information is implemented at a "middle" software layer using, e.g., a Transaction Monitoring Facility (TMF), that resides between an application layer and a file system layer. Use of the TMF consumes substantial overhead, without providing general file system recovery. Moreover, clients must be notified of new location of the data set in the event of takeover by the backup computer.

SUMMARY OF THE INVENTION

The invention comprises a technique for efficiently creating and serving a backup data set on a backup filer located at a remote site from a primary filer by essentially moving an entire operating environment of a primary data set to the backup filer. The primary filer is organized into one or more virtual filers (vfilers), one of which (the primary vfiler) is configured to serve data, such as the primary data set, for a client. In the event that the primary filer or primary vfiler becomes unavailable, the technique may be implemented as a disaster recovery or data migration sequence to enable efficient instantiation of a backup vfiler to serve the backup data set for the client.

Advantageously, the present invention allows a backup data set to become a "live" version substantially instantaneously upon failure of a primary data set (volume and/or qtree) or primary filer. The data set remains available, in its original operational context, while the failure is repaired. After repair, the live version of the data is transferred back to the primary filer, whose primary vfiler assumes its role of serving the data set. The inventive technique thus reduces "data downtime", i.e., the time during which a client loses access to its data set. In addition, the present invention provides efficient general file system recovery in a manner that is transparent to clients. The novel technique may further be used to migrate vfilers and their associated data sets between physical filers with very little data downtime.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
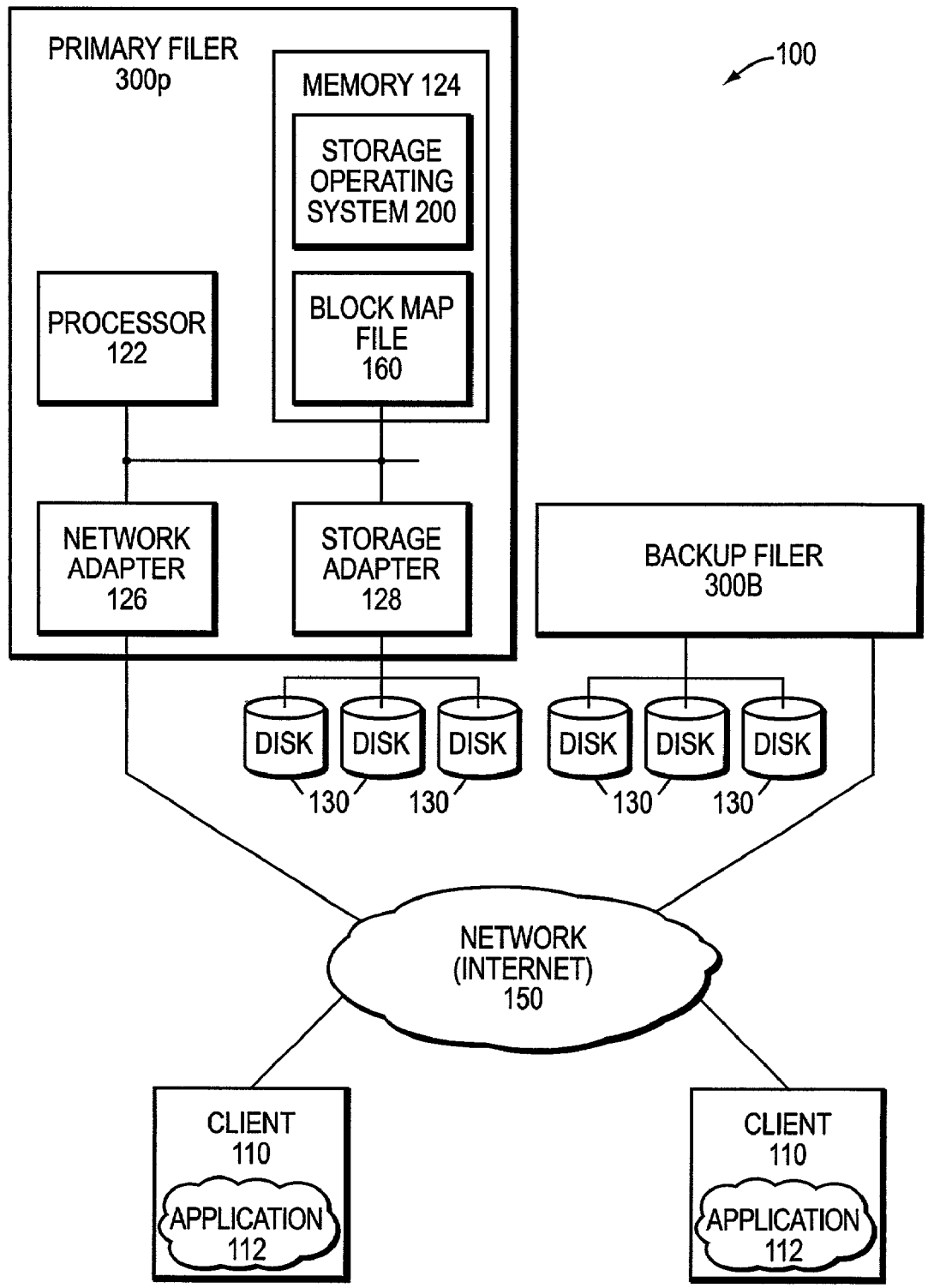
FIG. 1 is a schematic block diagram of a computer network including a plurality of servers that may be advantageously used with the present invention.

FIG. 1 is a schematic block diagram of a network environment 100 including a plurality of file servers or filers $300_{P,B}$, such as network storage appliances, which may be advantageously used with the present invention. Each filer 300 is a computer that provides file service relating to the organization of information on storage devices, such as disks 130. Each filer 120 comprises a processor 122, a memory 124, a network adapter 126 and a storage adapter 128 interconnected by a system bus. Each filer 300 also includes a storage operating system 200 that implements a file system to logically organize the information as a hierarchical structure of directories and files on the disks.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 may comprise a network interface card (NIC) having the mechanical, electrical and signaling circuitry needed to connect the filer 300 to one or more clients 110 over a computer network 150, such as the conventional Internet. Each client 110 may be a general-purpose computer configured to execute applications 112. Moreover, each client 110 may interact with the filer 300 in accordance with a client/server model of information delivery. That is, the client may request the services of the filer, and the filer may return the results of the services requested by the client, by exchanging packets encapsulating, e.g., the Common Internet File System (CIFS) protocol or Network File System (NFS) protocol format over the network 150.

The storage adapter 128 cooperates with the storage operating system 200 executing on the filer to access information requested by the client. The information may be stored on the disks 130 or other similar media adapted to store information. The storage adapter includes input/output (I/O) interface circuitry that couples to the disks over an I/O interconnect arrangement, such as a conventional high-performance, Fibre Channel serial link topology. The storage adapter retrieves the information that, if necessary, is processed by the processor 122 (or the adapter 128 itself) prior to being forwarded over the system bus to the network adapter 126, where the information is formatted into a packet and returned to the client 110.

Storage of information on the filer is preferably implemented as one or more storage "volumes" that comprise a cluster of physical storage disks 130, defining an overall logical arrangement of disk space. Each volume is generally associated with its own file system. To facilitate access to the disks 130, the storage operating system 200 implements a write-anywhere file system that logically organizes the information as a hierarchical structure of directories and files on the disks. Each "on-disk" file may be implemented as set of disk blocks configured to store information, such as data, whereas the directory may be implemented as a specially formatted file in which names and links to other files and directories are stored. In the illustrative embodiment described herein, the operating system is preferably the NetApp® Data ONTAP™ operating system available from Network Appliance, Inc., Sunnyvale, Calif. that implements a Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Figure 2:
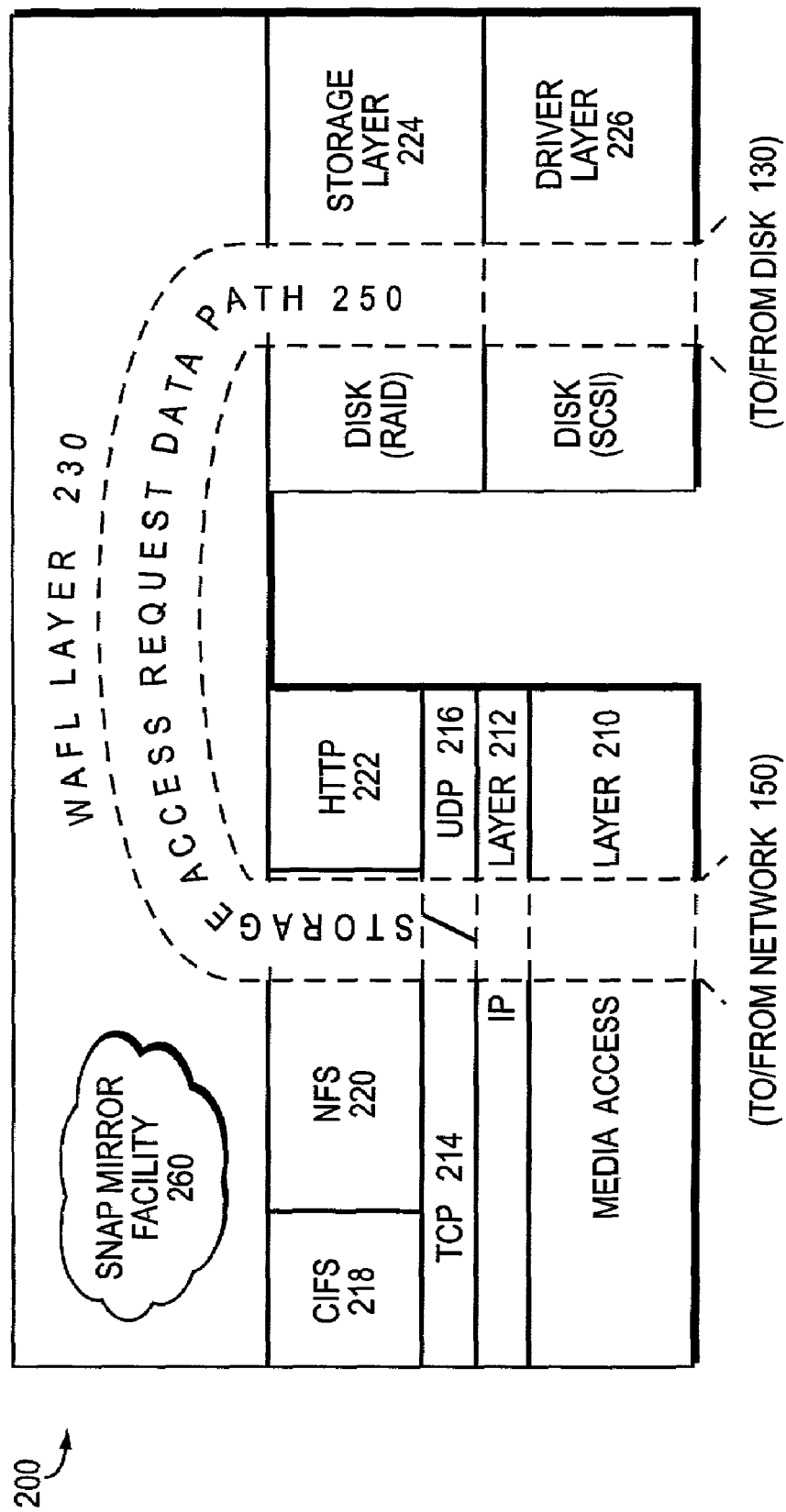
FIG. 2 is a schematic block diagram of a storage operating system that may be advantageously used with the present invention.

FIG. 2 is a schematic block diagram of the Data ONTAP operating system 200 that may be advantageously used with the present invention. The storage operating system comprises a series of software layers, including a media access layer 210 of network drivers (e.g., an Ethernet driver). The operating system further includes network protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the CIFS protocol 218, the NFS protocol 220 and the Hypertext Transfer Protocol (HTTP) protocol 222. In addition, the storage operating system 200 includes a disk storage layer 224 that implements a disk storage protocol, such as a Redundant Array of Independent Disks (RAID) protocol, and a disk driver layer 226 that implements a disk access protocol such as, e.g., a Small Computer Systems Interface (SCSI) protocol.

Bridging the disk software layers with the network and file system protocol layers is a WAFL layer 230 that preferably implements the WAFL file system. The on-disk format representation of the WAFL file system is block-based using, e.g., 4 kilobyte (kB) blocks and using inodes to describe the files. An inode is a data structure used to store information, such as meta-data, about a file. That is, the information contained in an inode may include, e.g., ownership of the file, access permission for the file, size of the file, file type and location of the data for the file on disk. The WAFL file system uses a file handle, i.e., an identifier that includes an inode number, to retrieve an inode from disk. The WAFL file system also uses files to store meta-data describing the layout of its file system. These meta-data files include, among others, an inode file. A file handle, i.e., an identifier that includes an inode number, is used to retrieve an inode from disk.

Operationally, a request from a client 110 is forwarded as, e.g., a conventional CIFS or NFS protocol packet over the computer network 150 and onto a filer 300 where it is received at the network adapter 126. A network driver of the media access layer 210 processes the packet, passes it onto the network protocol layers 212–216 and CIFS or NFS layer 218, 220 for additional processing prior to forwarding to the WAFL layer 230. Here, the WAFL file system generates operations to load (retrieve) the requested data from disk 130 if it is not resident "in core", i.e., in the memory 124. If the information is not in memory, the WAFL layer 230 indexes into the inode file using the inode number to access an appropriate entry and retrieve a logical volume block number (VBN). The WAFL layer then passes the logical VBN to the disk storage (RAID) layer 224, which maps that logical number to a disk block number and sends the latter to an appropriate driver (e.g., SCSI) of the disk driver layer 226. The disk driver accesses the disk block number from disk 130 and loads the requested data block(s) in memory 124 for processing by the filer. Upon completion of the request, the filer (and operating system) returns a reply to the client 110 over the network 150.

It should be noted that the software "path" through the storage operating system layers described above needed to perform data storage access for the client request received at the filer may alternatively be implemented in hardware. That is, in an alternate embodiment of the invention, the storage access request data path 250 may be implemented as logic circuitry embodied within a field programmable gate array (FPGA) or an application specific integrated circuit (ASIC). This type of hardware implementation may increase the performance of the file service provided by filer 300 in response to a file system request packet issued by client 110. Moreover, in another alternate embodiment of the invention, the processing elements of adapters 126, 128 may be configured to offload some or all of the packet processing and storage access operations, respectively, from processor 122, to thereby increase the performance of the file service provided by the filer. It is expressly contemplated that the various processes, architectures and procedures described herein can be implemented in hardware, firmware or software.

As used herein, the term "storage operating system" generally refers to the computer-executable code operable to perform a storage function in a storage system, e.g., that implements file system semantics and manages data access. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with storage applications described herein or with configurable functionality, which is configured for storage applications as described herein.

In addition, it will be understood to those skilled in the art that the inventive technique described herein may apply to any type of special-purpose (e.g., file serving appliance) or general-purpose computer, including a standalone computer or portion thereof, embodied as or including a storage system. A server may be defined as a computer adapted to provide application service to one or more clients; in this context, a virtual server is an instance of the application service provided to a client. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

A difficult and time-consuming issue in managing a storage system, such as a file server or filer, is backing up data to protect from data loss/corruption due to user error or server failure. The WAFL file system is adapted to "freeze frame" itself at any point in time and make that frozen versions of the file system available via special subdirectories that appear in the current (active) file system. Each freeze-framed version of the file system is called a snapshot™. The snapshot operates at the block level of the WAFL file system and represents a consistent, read-only copy of the file system at a particular time. Snapshots are described in U.S. Pat. No. 5,819,292 titled Method for Maintaining Consistent States of a File System and for Creating User-Accessible Read-Only Copies of a File System by David Hitz et al., issued on Oct. 6, 1998, which patent is hereby incorporated by reference as though fully set forth herein.

"Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other identifier and a count that distinguishes it from other PCPIs taken at other points in time. A PCPI can also include other information (metadata) about the active file system at the particular point in time for which the image is taken. The terms "PCPI" and "snapshot" shall be used interchangeably through out this patent without derogation of Network Appliance's trademark rights.

The Data ONTAP operating system leverages the WAFL snapshot capability to provide an automated file system replication (duplication) facility called the SnapMirror facility. SnapMirror technology provides asynchronous mirroring of a data set between a first filer ("primary filer $300_P$") and a second filer ("backup filer $300_B$") to thereby enable, among other things, remote maintenance of consistent copies of the primary filer's data on the backup filer. As used herein, a data set is defined as one or more storage units, such as volumes and/or qtrees, that when combined represent data being served, migrated and/or protected against disaster. In this sense, the duplicated data set could include all or part of a file system. In addition, the primary filer $300_P$ is a physical filer that is serving a client's data set and the backup filer $300_B$ is a different physical filer functioning as a SnapMirror target of a data set being served from the primary filer. The backup filer may also serve its own independent data set. Examples of techniques for duplicating all or part of a file system that may be advantageously used with the invention are described in U.S. patent application Ser. Nos. 09/127,497 titled File System Image Transfer, by Kleiman et al, filed Jul. 31, 1998 and 09/426,409 titled File System Image Transfer Between Dissimilar File Systems, by Kleiman et al., filed Oct. 25, 1999, which applications are hereby incorporated by reference as though fully set forth herein.

Broadly stated, the SnapMirror facility 260 periodically replicates a data set stored on the primary filer $300_P$ to the backup filer $300_B$ at a user-definable time interval, with the range being from one minute to one month. At the end of each replication event, the backup data set becomes an exact block-for-block "mirror" copy of the primary data set. At that point, the two data sets share identical data content and characteristics. The mirror is initialized by effectively copying the entire primary data set to the backup data set. Once this initial copy is complete, replication events thereafter copy only changed blocks from the primary data set to the backup data set to thereby provide an efficient data replication mechanism.

As with the snapshot feature, the SnapMirror facility operates at the block level of the file system. The WAFL file system keeps track of which blocks in the file system belong to different snapshots through the use of an internal data structure, called a block map file 160. The block map file 160 contains an entry for each block on the disks that is in use either by the active file system or a particular snapshot. Each entry contains a bitmap that monitors to which snapshots an individual block is associated. Each bit in the bitmap corresponds to a particular snapshot and is set if the block belongs to the snapshot or cleared if it does not. This format of the block map file allows a quick determination of differences between any two snapshots.

In particular, the SnapMirror facility 260 creates a copy of an entire data set by saving only changed blocks after a particular point in time. Using the block map file 160, two sequential snapshots are compared and the differences identified. Since this comparison takes place at the block level, only the changed blocks need be sent to the backup data set. By implementing the update transfers asynchronously, data latency issues inherent with remote synchronous mirroring techniques are eliminated. However, a SnapMirrored data set must typically be restored to the primary filer before it becomes available because the operating environment, e.g., operating system, security domain, etc., of the backup filer may be different from that of the primary filer.

The present invention comprises a technique for efficiently creating and serving a backup data set on a backup filer located at a remote site from a primary filer by essentially moving an entire operating environment of a primary data set served by the primary filer to the backup filer. According to the invention, the primary filer and backup filer are organized into one or more virtual filers (vfilers), each of which may be configured to serve data for clients. A vfiler is a logical partitioning of network and storage resources of the filer to establish an instance of a multi-protocol server. Each vfiler is maintained and executed entirely independent of other vfilers on the filer. To that end, dedicated filer resources, such as units of storage and network addresses of network interfaces, may be arbitrarily grouped and "hard" partitioned to establish security domains within the filer. Yet common filer resources, such as a storage operating system and a file system, may be shared among the vfilers.

Specifically, each vfiler is allocated a certain amount, i.e., a subset, of dedicated and distinct units of storage resources, and one or more dedicated and distinct network addresses. Each vfiler is also allowed shared access to the common file system on behalf of its client. Therefore, interpretations of a security object associated with, e.g., a client accessing the common file system may vary among vfilers. To address this, each vfiler is provided a vfiler context data structure (hereinafter "vfiler context") containing, among other things, references (i.e., pointers) to a set of configuration information that allows the vfiler to authenticate users, perform security operations and export/share data for all supported protocols. In addition, each vfiler is provided a set of management interfaces, including a command line interpreter (CLI).

Figure 3:
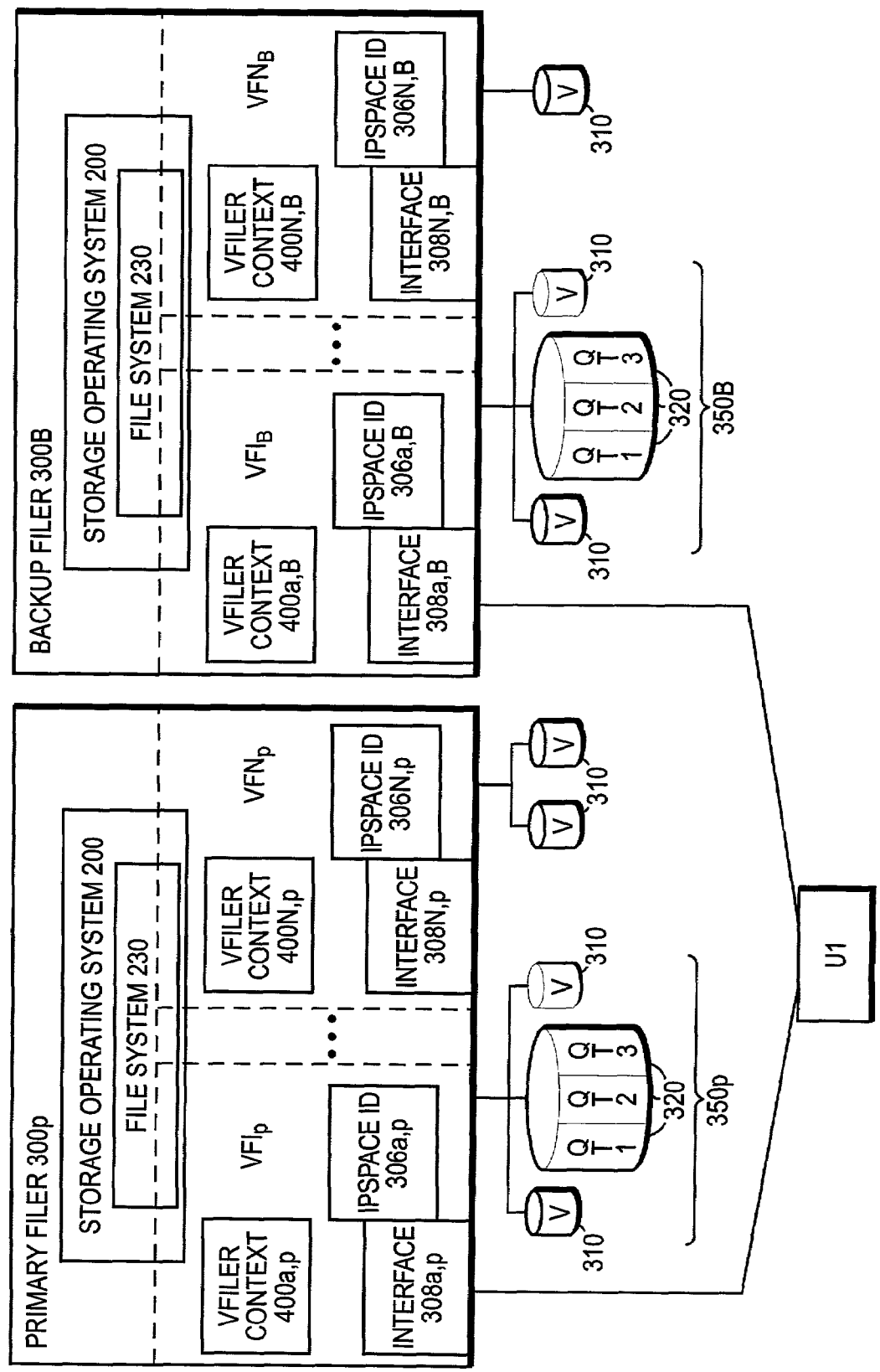
FIG. 3 is a schematic diagram of an embodiment of a filer platform having a plurality of virtual filers (vfilers) that may be advantageously used with the present invention.

FIG. 3 is a schematic diagram of an embodiment of a primary filer $300_P$ and backup filer $300_B$ that may be advantageously used with the present invention. Each filer is organized into one or more logical vfilers, each of which may be embodied as a server, e.g., a CIFS server, and referenced by a logical name, e.g., $VF1_{P,B}$–$VFN_{P,B}$. Each vfiler is configured to serve ("host") data, such as a data set, for a user or client. As defined herein, $VF1_P$ is a vfiler running on the primary filer $300_P$ and adapted to serve a primary data set $350_P$ for a client U1, whereas $VF1_B$ is a vfiler, running on the backup filer $300_B$, which is created either on demand or in response to a primary filer failure to serve a SnapMirrored copy ("backup data set $350_B$") of the primary data set for the client U1.

It should be noted that other configurations of filers are possible, including a configuration comprising two primary filers/vfilers and a single backup filer/vfiler or a multiple (triple) redundancy configuration wherein each primary filer synchronizes with two backup filers in an (triangle) arrangement such that if a failure arises, there is still redundant storage. It should be further noted that the backup data set $350_B$ can be generated using any mechanism, such as physical relocation of disks, use of backup tape or synchronous mirroring, that enables moving of the complete set of storage units (volumes and/or qtrees) comprising the data set from the primary filer to the backup filer. However, in the illustrative embodiment described herein, the backup data set $350_B$ is preferably generated using the SnapMirror facility 260.

Each vfiler VF1–VFN is configured with one or more network addresses, such as Internet Protocol (IP) addresses, that may be assigned to one or more network interfaces 308a–n. In this context, the term network interface refers to an IP addressable interface, including a "physical" NIC and a "soft" NIC, such as a virtual interface (VIF), a virtual local area network (VLAN) and an emulated LAN (ELAN). Each network interface is further assigned an IPspace identifier (ID) 306a–c that essentially "binds" the interface to an IPspace. An IPspace refers to each distinct IP address space in which the filer and its storage operating system participate. Each vfiler is associated with an IP address space and, thus, belongs to one IPspace. The IPspace is further described in copending and commonly-assigned U.S. patent application Ser. No. 10/035,666 titled, Technique for Enabling Multiple Virtual Filers on a Single Filer to Participate in Multiple Address Spaces with Overlapping Network Addresses, filed on Dec. 28, 2001 and which is hereby incorporated by reference as though fully set forth herein.

The units of storage resources allocated to each vfiler include a volume or sub-volume (qtree). A volume (V) 310 is a unit of storage comprising a file system or hierarchy of directories and files. A qtree, QT1-3 320, is a special directory similar to a mini-volume (mini-file system) or subdivision of a volume that has the property of being able to identify itself within a file system by, e.g., a qtree identifier (qtreeid) stored within an inode of a file. The vfiler architecture provides efficient utilization and management of these storage resources, including creation, assignment and mapping of the resources to and among the vfilers. For example, a virtual server (such as vfiler) and its associated storage resources (such as qtrees) may be migrated to a server (such as a filer) and consolidated with other virtual servers (vfilers) having similarly named resources. Since the storage resources are allocated on a per-vfiler basis, storage migration is transparent to a client because there is no change in the way the client refers to its data.

Each instance of a vfiler is described by "external" and "internal" configuration. External configuration describes the resources assigned to a vfiler (e.g., one or more IP addresses and one or more units of storage, such as an entire volume or a qtree on a volume) and capabilities available to a vfiler (e.g., protocols allowed to run on the vfiler). Internal configuration (i.e., internal to the vfiler) controls operation of various protocol modules or "vfiler options" associated with the vfiler. Examples of such options include whether a network information system (NIS) server is to be used with the vfiler and whether a particular protocol, such as NFS, uses TCP or UDP as its underlying transport.

Figure 4:
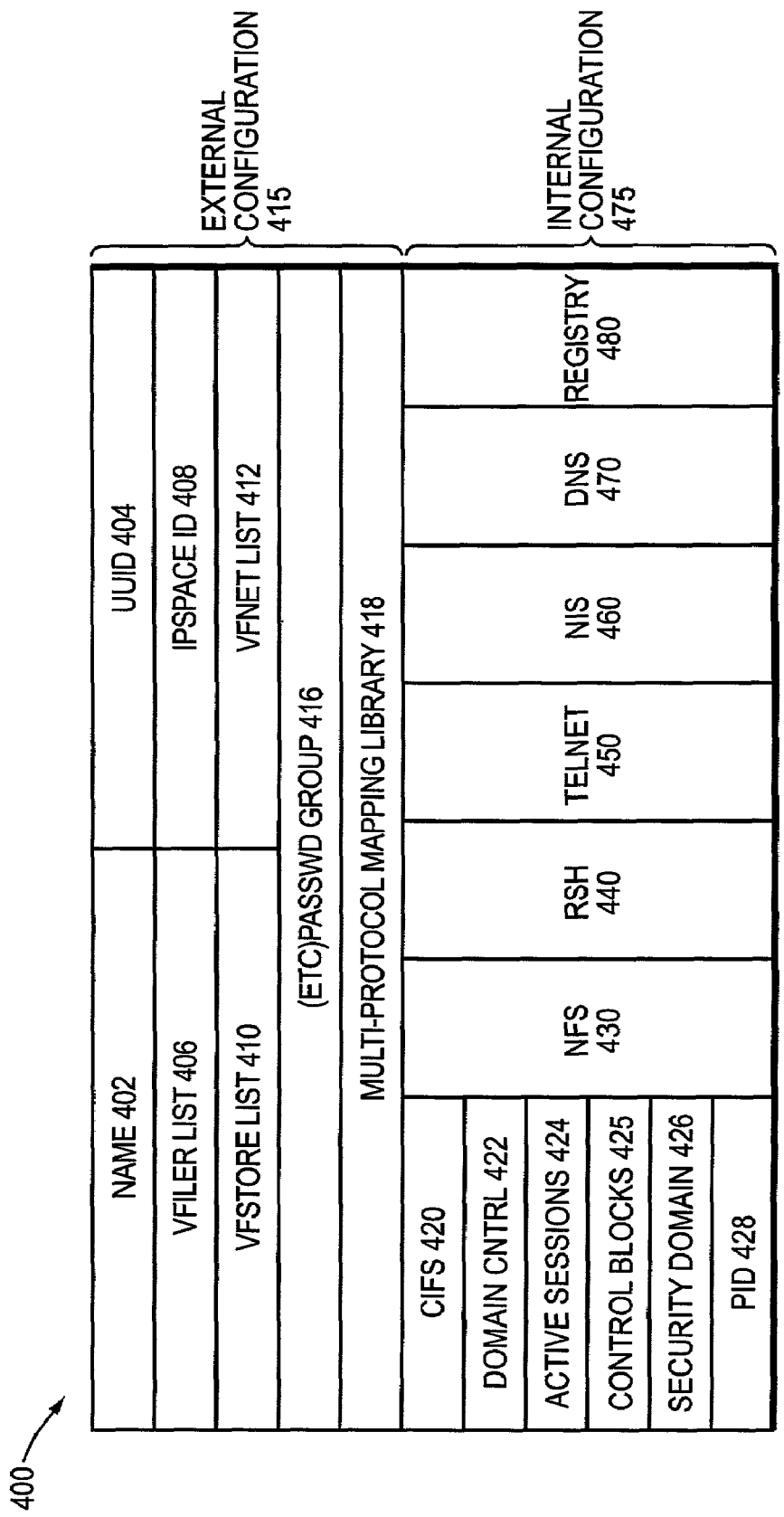
FIG. 4 is a schematic block diagram illustrating a vfiler context data structure that may be advantageously used with the present invention.

FIG. 4 is a schematic block diagram illustrating an in core representation of a vfiler context 400 containing external configuration 415 and internal configuration 475 or "state" needed to establish an instance of a multi-protocol server. The vfiler context 400 includes fields for holding a name 402 of the vfiler and a universally unique identifier (UUID 404) that is created with the vfiler context. A vfiler list field 406 contains a list of vfilers on the filer platform and an IPspace indicator (ID) field 408 holds the IPspace ID of the vfiler. Other fields hold a list 410 of virtual filer storage (vfstore) structures (soft objects) and a list 412 of virtual filer network (vfnet) soft objects.

Specifically, the vfstore list 410 comprises pointers to vfstore soft objects, each of which has a pointer that references a path to a unit of storage resource, such as a qtree or volume, allocated to the vfiler. The vfnet list 412 comprises pointers to vfnet soft objects, each of which has a pointer that references an interface address data structure representing an IP address assigned to the vfiler. Each vfnet object represents a "floating" capability that may be assigned to any network interface, e.g., a NIC, when an IP address is assigned to that NIC. If multiple IP addresses are assigned to the NIC, the capabilities of the NIC are effectively shared between multiple vfnet objects and, thus, potentially different vfilers. If only a single IP address is associated with an interface, only one vfnet object, and therefore only one vfiler, uses the capabilities of the NIC. The vfstore and vfnet objects are further described in copending and commonly-assigned U.S. patent application Ser. No. 10/035,664 titled, Architecture for Creating and Maintaining Virtual Filers on a Filer, filed on Dec. 28, 2001, which is hereby incorporated by reference as though fully set forth herein.

Each vfiler context 400 further includes information pertaining to the security domain of the vfiler to thereby enable controlled access to allocated and shared resources of the vfiler. In particular, each vfiler context has a pointer to /etc/passwd,group files 416 containing a user ID and group ID associated with each user password. The vfiler context structure 400 also implements a multi-protocol feature that supports multiple different clients having different types of security, and the ability to map those different client security types to different vfilers of a filer. The vfiler context implements this feature by providing a pointer that references a multi-protocol mapping library file 418 that enables translation of permission checking attributes from one protocol to another (e.g., NFS to NT security).

Each vfiler context 400 includes a plurality of "module" data structures that includes all information (such as global variables) needed for an instance of a particular protocol or subsystem. For example, a CIFS module data structure 420 contains all information needed for an instance of the CIFS protocol, including information about contacting a domain controller 422, active sessions 424 for the protocol and various control blocks 425 associated with the CIFS protocol. Information pertaining to a security domain 426 is also provided to enable NT-type security for a CIFS request. The security information includes a security identifier comprising a domain portion and a relative ID (RID) portion, the latter RID being similar to the user ID of UNIX security. Each CIFS module 420 also contains a process ID (PID 428) of the CIFS authentication process that enables the CIFS layer to send an authentication request to the correct CIFS authentication process.

There is a similar "per-module" data structure for each of the protocols and subsystems associated with a vfiler including, but not limited to, the NFS protocol 430, Remote SHell (RSH) protocol 440, Telnet protocol 450, NIS subsystem 460, domain name service (DNS) subsystem 470 and registry 480. The NIS subsystem or "yellow pages" is a service locator for the NFS protocol that is implemented as a distributed database storing security information, such user and group IDs associated with each user password. The NIS subsystem module 460 includes information for contacting a NIS controller when access to the distributed security database is required (using, e.g., the /etc/passwd,group information stored in file 416). The DNS subsystem facilitates resolution of a DNS name to a corresponding IP address.

The registry is a repository for configuration information pertaining to the hardware, software and users of the filer (and each vfiler). Each vfiler has its own per-vfiler registry, which is the only registry space "visible" when running in a per-vfiler context. All per-vfiler options and certain configuration data are stored in this per-vfiler registry. Other per-vfiler configuration information is stored in the /etc store associated with each vfiler. For example, configuration information that a vfiler administrator may need to access (such as a passwd file) is stored in the /etc directory off the root of the vfiler's volume.

Once the vfiler context 400 and its associated per-module data structures are created, the registry in the root of the root volume (owned by VF0) is updated with special entries containing configuration information specified in a vfiler create command. A vfiler may be created by the following example of a CLI vfiler create command of a user interface associated with the operating system:

vfiler create xyz[-s IPspace-name][-i IP address(s)][/vol/vol2][/vol/vol3/qt1]

wherein xyz is the name of the created vfiler, -s IPspace-name is the name of the IPspace to which the vfiler belongs and -i IP address(s) denotes a particular IP address or series of IP addresses of the vfiler. In addition, the notation /vol/vol2 is a first path descriptor to a first unit of storage, whereas the notation /vol/vol3/qt1 is a second path descriptor to a second unit of storage.

The root volume is a special volume from which the filer boots. The root volume contains configuration files for the filer; these files are stored in a directory in the root of the root volume. The special entries in the registry contain information about the configuration of each vfiler, including the storage paths, network addresses, UUID, etc.

When the filer boots, a vfiler discovery process (part of the boot process) interrogates the registry to determine if any vfilers have been created. If so, the discovery process retrieves the contents of the special entries within the registry and configures the in core memory structures (e.g., the vfiler context and per-module data structures) as if that logic were created in response to a vfiler create command. Thereafter, when executing code (e.g., in the CIFS layer) that specifies, e.g., contacting a domain controller, the code refers to the per-module instance of the CIFS protocol within the current vfiler context to acquire the domain controller contact information. Also, when the vfiler initializes, a set of initialization routines are executed to allocate memory locations, set variables to known values and create processes with the appropriate vfiler ID.

The external configuration information 415 used to describe an instance of a vfiler is preferably stored "on-disk" in the global registry of the physical filer (which is typically stored on the root volume of the filer), whereas the internal configuration 475 is stored in a private registry in the storage assigned to the vfiler. Given the split configuration of a vfiler, all information needed to create a vfiler on a new "head" is typically not available when migrating storage devices, such as disks, belonging to a vfiler from one physical filer to another. Note that a "head" is defined as all parts of a filer excluding disk shelves. The internal configuration is available, but the external information is only available on the old filer.

According to an aspect of the present invention, the external configuration information 415 can be redundantly stored on the migrated disks of the vfiler. However, this information must be organized (encapsulated) and stored in such as fashion that it is not accessible (modifiable) to an administrator of the vfiler. Specifically, the external configuration 415 is preferably encapsulated in a meta-data portion of all file system units (e.g., volumes 310) of the migrated disks. When the migrated disks of a disk shelf are attached to the filer platform, the disk software layers of the storage operating system search for the external configuration 415 in the attached storage units and instantiates those vfilers that are "discovered". This allows moving of a vfiler simply by removing the disk shelf containing its storage disks from one physical filer head and attaching them into another physical filer head or by encapsulating the external configuration information 415 in encrypted form on data that may be replicated or migrated.

According to another aspect of the invention, the entire operating environment of a primary data set served by the primary filer for a client U1 may be moved to the backup filer using a combination of the SnapMirror and vfiler technologies. That is, use of the SnapMirror facility enables mirroring of the primary data set $350_P$ on the primary filer $300_P$ as a backup data set $350_B$ on the backup filer $300_B$. Moreover, encapsulation of the external configuration 415 of the primary vfiler $VF1_P$ at the backup filer enables instantiation of a backup vfiler $VF1_B$ on the backup filer, which is preferably located at a remote site, i.e., removed in space, from the primary filer. In the event that the primary filer (or primary vfiler) becomes unavailable, the backup vfiler $VF1_B$ can then serve the Snapmirrored data set $350_B$ for the client U1.

Figure 5:
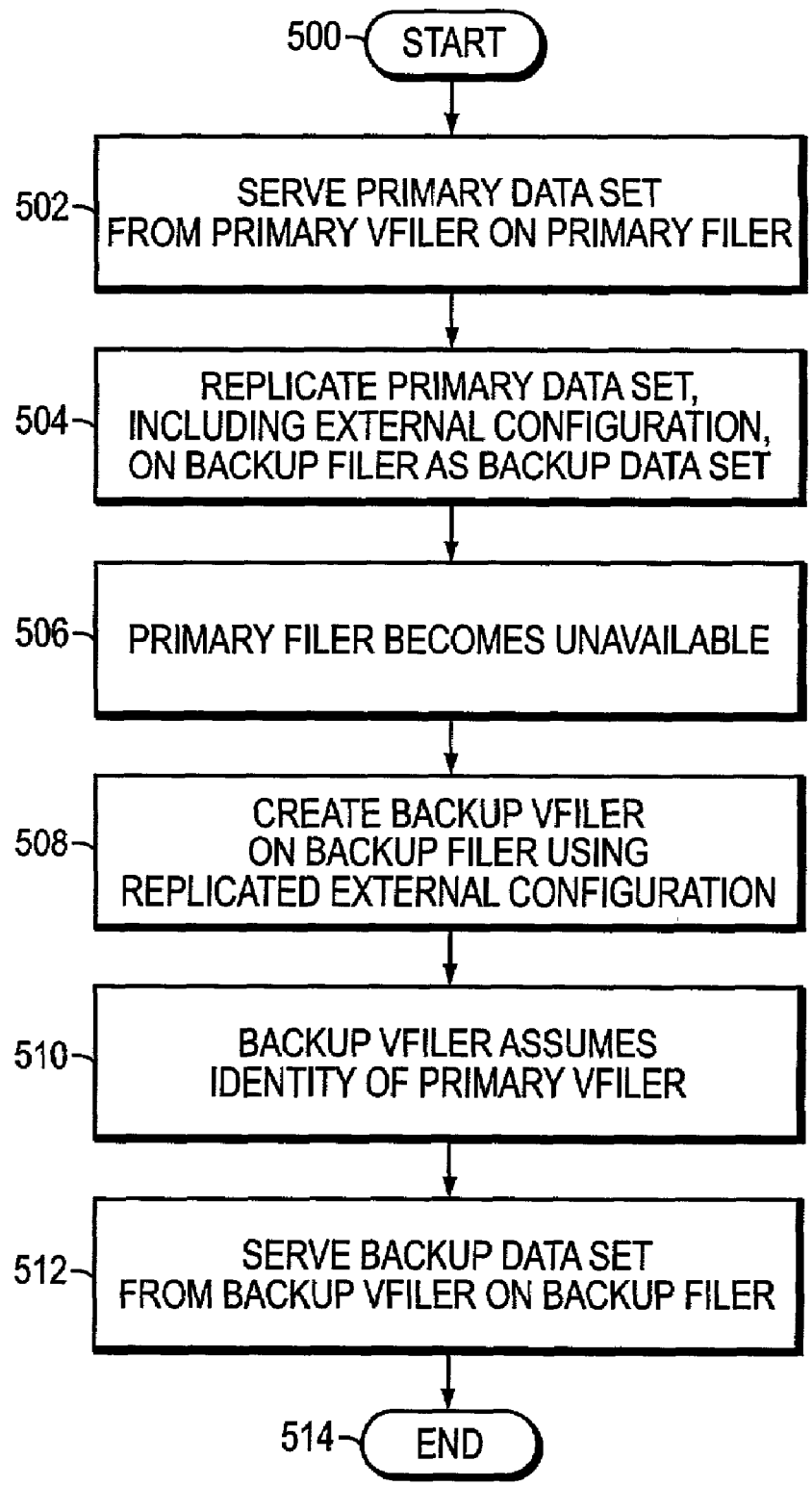
FIG. 5 is a flowchart illustrating the sequence of steps involved in a novel disaster recovery or data migration sequence according to the present invention.

FIG. 5 is a flowchart illustrating the sequence of steps involved in the novel disaster recovery or data migration sequence according to the present invention. The sequence starts in Step 500 and proceeds to Step 502 where, in an initial steady state, primary vfiler $VF1_P$ on primary filer $300_P$ serves a primary data set for a client. In Step 504, the primary data set is periodically replicated to the backup filer $300_B$ at a user-definable time interval in accordance with the SnapMirror facility. Notably, $VF1_P$ external configuration 415 is stored as part of the SnapMirrored data in a well-known place (path), e.g., a meta-data portion of the /etc directory off the root of the vfiler's volume.

In Step 506, the primary filer $300_P$ (or the primary vfiler $VF1_P$) becomes unavailable either due to a failure or planned data migration event. In response, the backup vfiler $VF1_B$ is created (instantiated) on the backup filer $300_B$ (Step 508) by, e.g., an administrator issuing a "vfiler create" CLI command with a special option to use the stored SnapMirrored $VF1_P$ external configuration at the specified, well-known path of the /etc directory. In the illustrative embodiment, an example of the format of the vfiler create command used to (re)create the backup vfiler $VF1_B$ on the backup filer $300_B$ is:

vfiler create xyz -r [vol/vol2]

wherein the name and path match the original name and first unit of storage for the primary vfiler $VF1_P$.

In Step 510, the created backup vfiler $VF1_B$ then "assumes the identity" of the primary vfiler $VF1_P$. As used herein, the term "assumes the identity" means reprogramming a network address, such as an IP address, of a network interface associated with the primary vfiler $VF1_P$ to the backup vfiler $VF1_B$ using, e.g., network configuration information stored on a NIC of the backup filer $300_B$ or a conventional network address resolution protocol (ARP). Note that the network configuration information is included in the vfiler-encapsulated meta-data (along with the external configuration 415) transferred to the backup filer. In Step 512, in a final steady state, the backup vfiler $VF1_B$ impersonates the primary vfiler $VF1_P$ by serving its client using the backup data set. In essence, $VF1_P$ has moved ("transitioned") from the primary filer $300_P$ to the backup filer $300_B$. This transition can be undone by following the same steps to essentially move the backup vfiler $VF1_B$ from the backup filer $300_B$ to the primary filer $300_P$. The sequence then ends in Step 514.

Advantageously, the present invention allows a backup data set to become a "live" version substantially instantaneously upon failure of a primary data set (volume and/or qtree) or primary filer. The data set remains available, in its original operational context, while the failure is repaired. This feature of the invention is notable in that clients of the filer need not be aware that disaster recovery is in play. Because the backup vfiler assumes the identity of the primary vfiler, client side support is not needed. After repair, the live version of the data is transferred back to the primary filer, whose primary vfiler assumes its role of serving the data set. The inventive technique thus reduces "data downtime", i.e., the time during which a client loses access to its data set.

While there has been shown and described an illustrative embodiment for efficiently creating and serving a backup data set on a backup filer located at a remote site from a primary filer, it is to be understood that various other adaptations and modifications may be made within the spirit and scope of the invention. For example, in an alternate embodiment, the novel technique described herein can also be used to migrate vfilers and their associated data sets between physical filers with very little data downtime. In addition, the invention allows online operating system upgrades for filers. That is, a filer can be taken offline while its data service responsibilities are assumed by its backup vfiler. The primary filer can then be upgraded, restarted, and reinstated as the data server. This capability is important for large "IT shops" where even scheduled downtime is to be avoided.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for efficiently creating and serving a backup data set on a backup server located at a remote site from a primary server, the method comprising the steps of:
   organizing the primary server into one or more virtual servers (vservers) including a primary vserver,
   configuring the primary vserver to serve a primary data set stored at the primary server for a client;
   moving an entire operating environment of the primary data set stored at the primary server to be stored at the backup server, the step of moving including copying external configuration that describes, in part, resources of the primary server available to the primary vserver, to create an encapsulated copy of the external configuration in the backup data set; and
   in response to unavailability of the primary server or primary vserver, instantiating a backup vserver on the backup server using the copy of the external configuration, to serve the backup data set for the client.

2. The method of claim 1 wherein the step of moving the entire operating environment comprises the step of replicating the primary data set to the backup server.

3. The method of claim 2 wherein the step of replicating comprises generating the backup data set by one of physically relocating disks from the primary server to the backup server and using backup tape.

4. The method of claim 2 wherein the step of replicating comprises the step of generating the backup data set using an automated file system replication facility.

5. The method of claim 2 wherein the step of instantiating comprises the step of issuing a vserver create command with an option to use the external configuration to thereby create the backup vserver at the backup server.

6. The method of claim 5 wherein the step of instantiating further comprises the step of reprogramming a network address of a network interface associated with the primary vserver to the backup vserver using network configuration information to thereby enable the backup vserver to assume an identity of the primary vserver.

7. The method of claim 6 wherein the replicated primary data set further includes the network configuration information.

8. A system adapted to efficiently create and serve a backup data set on a backup server located at a remote site from a primary server, the system comprising:
   a primary virtual server (vserver) embodied on the primary server and configured to serve a primary data set for a client;
   a file system replication facility of a storage operating system executing on the primary server, the file system replication facility replicating an entire operating environment of the primary data set stored at the primary server, including external and network configuration of the primary vserver, the external configuration describes, in part, resources of the primary server available to the primary vserver, to create an encapsulated copy of the external configuration in the backup data set stored on the backup server; and
   a backup vserver instantiated on the backup server in response to a server create command specifying the replicated external and network configuration, the instantiated backup vserver configured to serve the backup data set for the client in the event of unavailability of the primary vserver.

9. The system of claim 8 wherein each vserver is a logical partitioning of network and storage resources of the server to establish an instance of a multi-protocol server.

10. The system of claim 8 wherein the file system replication facility is a asynchronous mirroring facility.

11. The system of claim 8 wherein the primary server is one of a plurality of primary servers and the backup server is one of a plurality of backup servers, and wherein each primary server synchronizes with the backup servers in an arrangement such that if a failure arises, the backup data set is available to serve the client.

12. Apparatus for efficiently creating and serving a backup data set on a backup server located at a remote site from a primary server, the apparatus comprising:
   means for organizing the primary server into one or more virtual servers (vservers) including a primary vserver;
   means for configuring the primary vserver to serve a primary data set stored at the primary server for a client;
   means for moving an entire operating environment of the primary data set stored at the primary server to be stored at the backup server, the means for moving including means for copying external configuration that describes, in part, resources of the primary server available to the primary vserver, to create an encapsulated copy of the external configuration in the backup data set; and
   in response to unavailability of the server or primary vserver, means for instantiating a backup vserver on the backup server using the copy of the external configuration, to serve the backup data set for the client.

13. The apparatus of claim 12 wherein the means for moving the entire operating environment comprises means for replicating the par data set to the backup server.

14. The apparatus of claim 13 wherein the means for replicating comprises a file system replication facility.

15. The apparatus of claim 13 wherein the means for instantiating comprises means for issuing a vserver create command with an option to use the external configuration to thereby create the backup vserver at the backup server.

16. The apparatus of claim 15 wherein the means for instantiating further comprises means for reprogramming a network address of a network interface associated with the primary vserver to the backup vserver using network configuration information to thereby enable the backup vserver to assume an identity of the primary server.

17. The apparatus of claim 16 wherein the replicated primary data set further includes the network configuration information.

18. A computer readable medium containing executable program instructions for efficiently creating and serving a backup data set on a backup server located at a remote site from a primary server, the executable program instructions comprising program instructions for:
   organizing the primary server into one or more virtual servers (vservers) including a primary vserver;
   configuring the primary vserver to serve a primary data set stored at the primary server for a client;

moving an entire operating environment of the primary data set stored at the primary server to be stored at the backup server, the moving including copying eternal configuration that describes, in part, resources of the primary server available to the primary vserver, to create an encapsulated copy of the external configuration in the backup data set; and in response to unavailability of the primary server or primary vserver, instantiating a backup vserver on the backup server using the copy of the external configuration, to serve the backup data set for the client.

19. The computer readable medium of claim 18 wherein the program instruction for moving the entire operating environment comprises a program instruction for replicating the primary data set to the backup server.

20. The computer readable medium of claim 19 wherein the program instruction for instantiating comprises a program instruction for issuing a vserver create command with an option to use the external configuration to thereby create the backup vserver at the backup server.

21. The computer readable medium of claim 20 wherein the program instruction for instantiating further comprises a program instruction for reprogramming a network address of a network interface associated with the primary vserver to the backup vserver to thereby enable the backup vserver to assume an identity of the primary vserver.

22. A method for providing backup for a server, comprising:

organizing a primary server into one or more virtual servers (vservers) including a primary vserver;

configuring the primary vserver to serve a primary data set for a client;

moving an entire operating environment of the primary data set to the backup server before the primary vserver is unavailable, the backup server located at a site remote from the server by the step of moving including copying external configuration that describes, in part, resources of the primary server available to the primary vserver, to create an encapsulated copy of the external configuration in the backup data set; and in response to unavailability of the primary vserver, issuing a command to create a new backup vserver on the backup server using the copy of the external configuration to serve the backup data set for the client.

23. The method of claim 22 wherein the step of instantiating comprises the step of issuing a vserver create command with an option to use the external configuration to thereby create the backup vserver at the backup server.

24. The method of claim 23 wherein the step of instantiating further comprises the step of reprogramming a network address of a network interface associated with the primary vserver to the backup vserver using network configuration information to thereby enable the backup vserver to assume an identity of the primary vserver.

25. An apparatus for providing backup for a server, comprising:

means for organizing a primary server into one or more virtual servers (vservers) including a primary vserver;

means for configuring the primary vserver to serve a primary data set for a client;

means for moving an entire operating environment of the primary data set to the backup server before the primary vserver is unavailable, the backup server located at a site remote from the server, the means for moving including means for copying external configuration that describes, in part, resources of the primary server available to the primary vserver, to create an encapsulated copy of the external configuration in the backup data set; and in response to unavailability of the primary vserver, means for issuing a command to create a new backup vserver on the backup server using the copy of the external configuration to serve the backup data set for the client.

26. The apparatus of claim 25 wherein the step of instantiating comprises the means for issuing a vserver create command with an option to use the external configuration to thereby create the backup vserver at the backup server.

27. The apparatus of claim 26 wherein the step of instantiating further comprises the means for reprogramming a network address of a network interface associated with the primary vserver to the backup vserver using network configuration information to thereby enable the backup vserver to assume an identity of the primary vserver.

28. An apparatus for providing backup for a server, comprising:

a primary server organized into one or more virtual servers (vservers) including a primary vserver;

the primary vserver configured to serve a primary data set for a client;

a processor for moving an entire operating environment of the primary data set to the backup server before the primary vserver is unavailable, the backup server located at a site remote from the primary server, by the processor configured to copy external configuration that describes, in part, resources of the primary server available to the primary vserver, and to create an encapsulated cony of the external configuration in the backup data set; and in response to unavailability of the primary server, the processor configured to issue a command to create a new backup vserver on the backup server using the copy of the external configuration to serve the backup data set for the client.

29. The apparatus of claim 28 wherein the processor instantiates the backup vserver by issuing a vserver create command with an option to use the external configuration to thereby create the backup vserver at the backup server.

30. The apparatus of claim 29 wherein the processor instantiates the backup vserver by reprogramming a network address of a network interface associated with the primary vserver to the backup vserver using network configuration information to thereby enable the backup server to assume an identity of the primary vserver.

31. A computer readable medium containing executable program instructions for providing backup for a server, comprising:

organizing a primary server into one or more virtual servers (vservers) including a primary vserver;

configuring the primary vserver to serve a primary data set for a client;

moving an entire operating environment of the primary data set to the backup server before the primary vserver is unavailable, the backup server located at a site remote from the primary server, by copying external configuration that describes, in part, resources of the primary server available to the primary vserver, to create an encapsulated copy of the external configuration in the backup data set; and in response to unavailability of the primary vserver, issuing a command to create a new backup vserver on the backup server using the copy of the external configuration to serve the backup data set for the client.

32. A method for providing backup for a server, comprising;
configuring a primary server to have a primary virtual server (vserver), the primary vserver serving a primary data set stored at the primary server;
prior to unavailability of the primary server, mirroring the primary data set from the primary server to a backup server, to form a backup data set at the backup server;
prior to unavailability of the primary server, replicating vserver configuration information of the primary vserver from the primary server to the backup server, where replicating the configuration information includes copying an external configuration that describes, in part, resources of the primary server available to the primary vserver, to create an encapsulated copy of the external configuration in the backup data set; and
in response to detecting unavailability of the primary server, instantiating a backup vserver at the backup server by issuing a vserver create command, the vserver create command includes an option to cause the backup vserver to be configured using the configuration information of the primary vserver, the backup vserver serving the backup data set.

33. The method of claim 32 further comprising the step of:
subsequent to the step of mirroring, periodically replicating changed information from the primary data set to the backup data set.

34. The method of claim 33 wherein the step of replicating further comprises the step of:
determining blocks to be replicated from the primary data set to the backup data using a block map file to compare differences between the primary data set and the backup data set at the block level.

35. The method of claim 32 wherein the backup server is located at a site remote from the primary vserver, and wherein the backup server and the server have independent storage subsystems.

36. The method of claim 32 wherein the step of instantiating further comprises the step of reprogramming a network address of a network interface associated with the primary vserver to the backup vserver using the configuration information, to thereby enable the backup vserver to assume an identity of the primary vserver.

37. An apparatus for providing backup for a server, comprising:
a primary server configured to have a primary virtual server (vserver), the primary vserver serving a primary data set stored at the primary server;
a file system replication facility of an operating system executing on the primary server, the file system replication facility executing while the primary server is available, the file system replication facility mirroring the primary data set from the primary server to a backup server to form a backup data set at the backup server, the file system replication facility also replicating vserver configuration information of the primary vserver from the primary server to the backup server, where the file system is configured to replicate the configuration information including copying an external configuration that describes, in part, resources of the primary server available to the primary vserver, to create an encapsulated copy of the external configuration in the backup data set;

a vserver create command, the vserver create command including an option to use the configuration information of the primary vserver; and
a backup vserver instantiated by the vserver create command on the backup server in response to detecting unavailability of the primary server, the backup vserver configured using the configuration information of the primary vserver, the backup vserver serving the backup data set.

38. The apparatus of claim 37 wherein the file system replication facility is adapted to periodically replicate changed information from the primary data set to the backup data set.

39. The apparatus of claim 38 wherein the file system replication facility is further adapted to determine blocks to be replicated from the primary data set to the backup data using a block map file to compare differences between the primary data set and the backup data set at the block level.

40. The apparatus of claim 37 wherein the backup server is located at a site remote from the primary vserver, and wherein the backup server and the primary server have independent storage subsystems.

41. The apparatus of claim 37 wherein the configuration information comprises network interface information associated with the primary vserver, and the backup vserver is adapted to assume a network identity of the primary vserver using the network interface information.

42. An apparatus for providing backup for a server, comprising:
means for configuring a primary server to have a primary virtual server (vserver), the primary vserver serving a primary data set stored at the primary server;
means for mirroring the primary data set from the primary server to a backup server, to form a backup data set at the backup server;
means for replicating vserver configuration information of the primary vserver from the primary server to the backup server, where replicating the configuration information includes copying an external configuration that describes, in part, resources of the primary server available to the primary vserver, to create an encapsulated copy of the external configuration in the backup data set; and
means for instantiating a backup vserver at the backup server by issuing a vserver create command, the vserver create command includes an option to cause the backup vserver to be configured using the configuration on information of the primary vserver, the backup vserver serving the backup data set.

43. A computer readable medium comprising executable program instructions for providing backup for a server, the executable program instructions adapted for
configuring a primary server to have a primary virtual server (vserver), the primary vserver serving a primary data set stored at the primary server;
prior to unavailability of the primary server, mirroring the primary data set from the primary server to a backup server, to form a backup data set at the backup server;
prior to unavailability of the primary server, replicating vserver configuration information of the primary vserver from the primary server to the backup server, where replicating the configuration information includes copying an external configuration that describes, in part, resources of the primary server available to the primary vserver, to create an encapsulated copy of the external configuration in the backup data set; and in response to detecting unavailability of the primary server, instantiating a backup vserver at the backup server by issuing a vserver create command, the vserver create command includes an option to cause the backup vserver to be configured using the configuration information of the primary vserver, the backup vserver serving the backup data set.

* * * * *